(12) United States Patent
Gong et al.

(10) Patent No.: US 11,500,577 B2
(45) Date of Patent: Nov. 15, 2022

(54) METHOD, ELECTRONIC DEVICE, AND COMPUTER PROGRAM PRODUCT FOR DATA PROCESSING

(71) Applicant: EMC IP Holding Company LLC, Hopkinton, MA (US)

(72) Inventors: Shuguang Gong, Tianjin (CN); Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/146,819

(22) Filed: Jan. 12, 2021

(65) Prior Publication Data

US 2022/0197539 A1     Jun. 23, 2022

(30) Foreign Application Priority Data

Dec. 17, 2020   (CN) .......................... 202011496988.7

(51) Int. Cl.
  G06F 12/00       (2006.01)
  G06F 3/06        (2006.01)
(52) U.S. Cl.
  CPC .......... *G06F 3/0655* (2013.01); *G06F 3/0631* (2013.01); *G06F 3/0634* (2013.01); *G06F 3/0635* (2013.01); *G06F 3/0659* (2013.01); *G06F 3/0673* (2013.01); *G06F 3/0679* (2013.01); *G06F 3/0689* (2013.01)
(58) Field of Classification Search
  CPC ................... G06F 3/064; G06F 3/0659; G06F 2212/7201; G06F 3/0664; G06F 3/0679; G06F 3/0631; G06F 3/0634; G06F 3/0673; G06F 3/0688; G06F 3/0689; G06F 3/0655; G06F 12/10
  See application file for complete search history.

(56) References Cited

U.S. PATENT DOCUMENTS

| | | | |
|---|---|---|---|
| 2010/0274983 A1* | 10/2010 | Murphy | G06F 11/1448 711/162 |
| 2014/0307554 A1* | 10/2014 | Basso | H04L 49/351 370/235 |
| 2017/0039142 A1* | 2/2017 | Sundararaman | G06F 3/0673 |
| 2019/0121545 A1* | 4/2019 | La Fratta | G06F 3/0679 |

\* cited by examiner

*Primary Examiner* — Gurtej Bansal
(74) *Attorney, Agent, or Firm* — Womble Bond Dickinson (US) LLP (57) ABSTRACT

Embodiments of the present disclosure relate to a method, an electronic device, and a computer program product for data processing. According to an exemplary implementation of the present disclosure, a method for data processing includes: determining a type of target data associated with an access request, the type including at least one of: computation data type, recovery data type, and hot data type; selecting, based on the type, a target access mode of a storage device associated with the target data from a direct access mode and a block device mode; and causing the storage device to access the target data in the target access mode. As a result, good management of quality of service can be achieved for storage devices.

17 Claims, 4 Drawing Sheets

METHOD, ELECTRONIC DEVICE, AND COMPUTER PROGRAM PRODUCT FOR DATA PROCESSING

CROSS-REFERENCE TO RELATED APPLICATION

This patent application claims priority, under 35 U.S.C. § 119, of Chinese Patent Application No. 202011496988.7, filed Dec. 17, 2020, which is incorporated by reference in its entirety.

TECHNICAL FIELD

Embodiments of the present disclosure generally relate to data processing, and in particular, to a method, an electronic device, and a computer program product for data processing.

BACKGROUND

A Persistent Memory (PMEM), also referred to as a permanent memory, is a nonvolatile, low-latency, and high-bandwidth storage device. It has the ability to protect data during system damage or power failure. A persistent memory is usually located in the memory bus and close to a central processing unit (CPU). With low latency and high bandwidth, a persistent memory can be used as a supplement to the memory/storage device tier to reduce the performance gap between a dynamic random access memory (DRAM) and a disk, thereby improving system performance. A persistent memory is ideal for applications that require high performance and data consistency to allow frequent access to large data sets, such as big data analysis, redundant array of independent disks (RAID) cache, in-memory databases, and online transaction processing. However, the management of quality of service for the persistent memory is poor.

SUMMARY OF THE INVENTION

Embodiments of the present disclosure provide a method, an electronic device, and a computer program product for data processing.

In a first aspect of the present disclosure, a method for data processing is provided. The method includes: determining a type of target data associated with an access request, the type including at least one of: computation data type, recovery data type, and hot data type; selecting, based on the type, a target access mode of a storage device associated with the target data from a direct access mode and a block device mode; and causing the storage device to access the target data in the target access mode.

In a second aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to perform actions including: determining a type of target data associated with an access request, the type including at least one of: computation data type, recovery data type, and hot data type; selecting, based on the type, a target access mode of a storage device associated with the target data from a direct access mode and a block device mode; and causing the storage device to access the target data in the target access mode.

In a third aspect of the present disclosure, a computer program product is provided. The computer program product is tangibly stored on a non-transitory computer-readable medium and includes machine-executable instructions, wherein the machine-executable instructions, when executed, cause a machine to implement any step of the method described according to the first aspect of the present disclosure.

The Summary of the Invention section is provided in order to introduce the selection of concepts in a simplified form, which will be further described in the Detailed Description below. The Summary of the Invention section is not intended to identify key features or essential features of the present disclosure, nor is it intended to limit the scope of the present disclosure.

BRIEF DESCRIPTION OF THE DRAWINGS

By describing exemplary embodiments of the present disclosure in more detail in conjunction with the accompanying drawings, the above and other objectives, features, and advantages of the present disclosure will become more apparent. In the exemplary embodiments of the present disclosure, the same reference numerals generally represent the same components.

In the accompanying drawings, the same or corresponding numerals represent the same or corresponding parts.

DETAILED DESCRIPTION

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided so that the present disclosure will be more thorough and complete, and can fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" means "at least one further embodiment." The terms "first," "second," etc., may refer to different or the same objects. Below may also include other explicit and implicit definitions.

As mentioned above, a persistent memory allows the use of new storage tiers to optimize data management and improve system performance. However, traditionally, there have been several problems with the use of a persistent memory. For example, with the widespread application of the persistent memory, it has become a key resource in a system, but how to efficiently and evenly utilize the persistent memory is still a new field of research. In addition, for different platforms and service levels, the required quality of service may be different. However, traditionally, quality of service management cannot be performed on the persistent memory to meet different requirements for different platforms and service levels. Further, traditionally, research on the persistent memory has focused more on improving the performance of the persistent memory, but has not paid attention to implementing priority-based input output (TO) scheduling in persistent memory drivers.

According to an example embodiment of the present disclosure, an improved solution for data processing is proposed. In this solution, a type of target data associated with an access request can be determined. The type of the target data includes computation data type, recovery data type, and hot data type. A target access mode of a storage device associated with the target data can be selected from a direct access mode and a block device mode based on the type of the target data. Thus, the storage device can access the target data in the target access mode.

In this way, the solution can perform quality of service management on the storage device by providing different access modes for different types of data, thereby optimizing data management and improving system performance. The embodiments of the present disclosure will be specifically described below with reference to the accompanying drawings.

Figure 1:
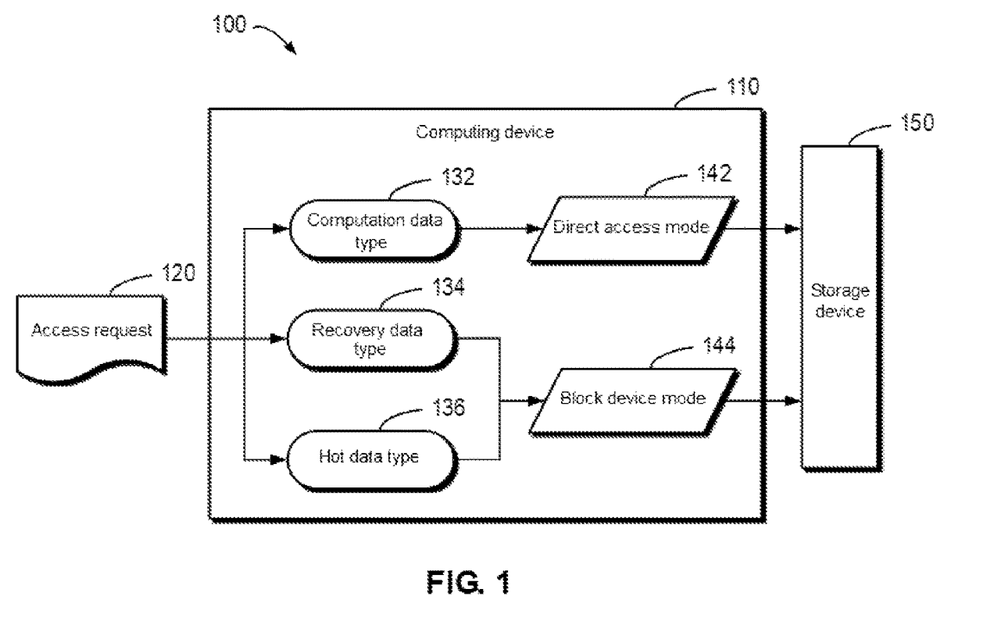
FIG. 1 illustrates a schematic diagram of an example of a data processing environment where some embodiments of the present disclosure can be implemented.

FIG. 1 illustrates a schematic diagram of an example of data processing environment 100 where some embodiments of the present disclosure can be implemented. Data processing environment 100 includes computing device 110. For example, computing device 110 may be any computing device with computing capabilities. As an example, computing device 110 may be a personal computer, a tablet computer, a wearable device, a cloud server, a mainframe, a distributed computing system, and the like.

In data processing environment 100, computing device 110 is configured to perform quality of service management on storage device 150. Storage device 150 may be any storage device with low latency and high bandwidth, such as a persistent memory. As mentioned above, a persistent memory allows the use of new storage tiers to optimize data management and improve system performance. For example, in a data deduplication system, a persistent memory can be used for key-value storage, as a next-generation nonvolatile random access memory (NVRAM), and for fast storage of hot data.

When the persistent memory is used for key-value storage, some computation data such as register values, metadata, and index tables can be stored in the persistent memory to speed up computation. In addition, when the persistent memory is used as a next-generation NVRAM in the data deduplication system, it can achieve data protection through vault and restoration functions. This helps restore interrupted tasks after system damage or power failure. Further, when the persistent memory is used for fast storage of hot data, a persistent memory driver makes the persistent memory to be presented as a fast block storage device to applications and operating systems. In this way, some solid-state drive (SSD) tasks can be migrated to the persistent memory. This means that applications, file systems, volume managers, and other storage middleware layers can use the persistent memory just like traditional storage devices and do not need to make any modification.

The persistent memory driver also provides flexible 10 access modes to meet different IO requirements. The access modes it provides mainly include a Direct Access (DAX) mode and a block device mode. In the direct access mode, direct access to the file system or memory loading/storage can be used to directly access the persistent memory, thereby achieving low access delay without the need for page caching. In the block device mode, the persistent memory used as a standard block device is accessed via a block layer through a standard file system. In addition, in a low-level persistent memory driver, both CPU memory duplication and Direct Memory Access (DMA) can be used for data storage to achieve a trade-off between CPU workload and IO throughput.

In view of the above-mentioned characteristics of storage device 150 such as a persistent memory, computing device 110 may perform quality of service management on storage device 150. Specifically, computing device 110 implements a new dynamic quality of service management mechanism to improve the use efficiency and quality of service of the persistent memory in, for example, the data deduplication system. The strategy used in the quality of service management mechanism is designed according to characteristics such as data type, service level, and platform. For example, computing device 110 may implement application-aware 10 path decisions. For different data types, service levels, and platforms, a persistent memory can use different 10 paths, for example, as caches or block storage devices, to provide fast and consistent data access, and to adapt to different performance and capacity requirements.

For this reason, in some embodiments, computing device 110 acquires access request 120 and determines the type of target data associated with the access request. The type of the target data includes computation data type 132, recovery data type 134, and hot data type 136. Computing device 110 selects a target access mode of storage device 150 associated with the target data from direct access mode 142 and block device mode 144 based on the type of the target data. Thus, computing device 110 causes storage device 150 to access the target data in the target access mode. Hereinafter, the quality of service management performed by computing device 110 will be described in detail with reference to FIGS. 2 and 3.

Figure 2:
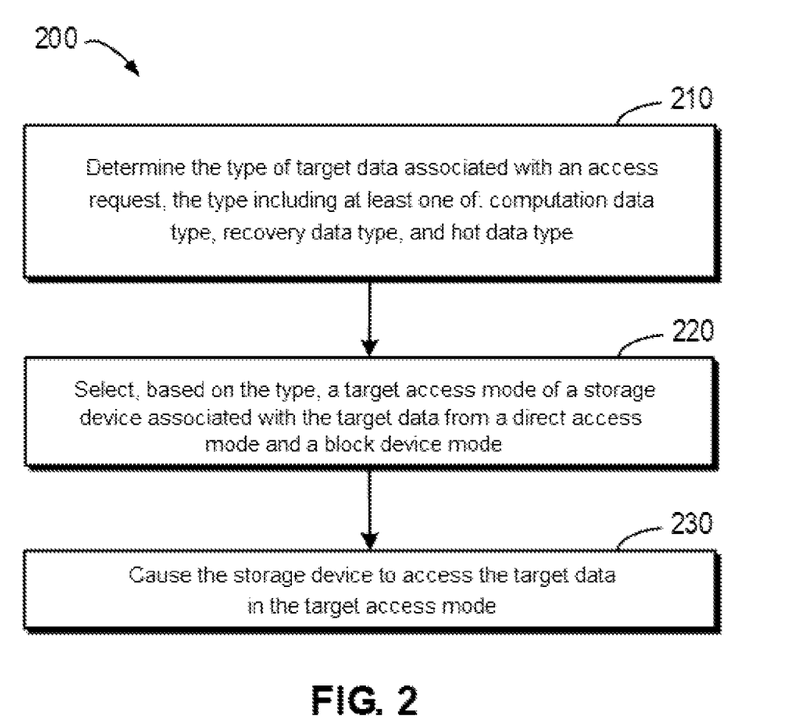
FIG. 2 illustrates a flow chart of an example of a method for data processing according to some embodiments of the present disclosure.

FIG. 2 illustrates a flow chart of method 200 for data processing according to some embodiments of the present disclosure. Method 200 may be implemented by computing device 110 as shown in FIG. 1. Alternatively, method 200 may also be implemented by other entities besides computing device 110. It should be understood that method 200 may further include additional steps that are not shown and/or may omit the shown steps, and the scope of the present disclosure is not limited in this aspect.

At 210, computing device 110 determines the type of target data associated with access request 120. As described above, the type of the target data includes computation data type 132, recovery data type 134, and hot data type 136. Computation data type 132 is a type of data that affects the computation speed of a task being performed. For example, register values, metadata, index tables, etc. can all be attributed to computation data type 132. In this case, the computation data type includes the register data type, the metadata type, and/or the index table type. The recovery data type is a type of data used to restore an interrupted task. In addition, the hot data type is a type of data whose access frequency exceeds a threshold frequency.

At 220, computing device 110 selects a target access mode of storage device 150 associated with the target data from direct access mode 142 and block device mode 144 based on the type of the target data. In some embodiments, if the type of the target data is computation data type 132, computing device 110 may select direct access mode 142 as the target access mode. Computation data helps to speed up computing tasks in the system. System performance is more sensitive to the access delay of computation data. In addition, the size of computation data involved in each access request is usually small, but the access frequency is high. Therefore, for computation data, the IO path should be designed to be simple and fast. Direct access mode 142 can provide fast data access for an ongoing task.

If the type of the target data is recovery data type 134 and hot data type 136, computing device 110 may select block device mode 144 as the target access mode. Specifically, if the type of the target data is recovery data type 134, computing device 110 may determine a synchronous block device mode combined with direct memory access as the target access mode.

For example, unexpected power failures or other failures may cause data corruption. In order to implement a data lossless architecture, intermediate key data such as those during data deduplication, needs to be stored in a persistent memory. This can help restore interrupted tasks through data vault and restoration functions during unexpected system crashes and restarts. The recovery data includes a large amount of block data, for example, the data involved in each access request is usually larger than 32 KB. However, the importance of the recovery data is lower than the computation data. For this reason, an IO path for the recovery data only needs to be designed to meet the upper limit of bandwidth required by the data deduplication process and ensure that it will not become a bottleneck. Therefore, for the recovery data, block device mode 144 can be used. In addition, block device mode 144 can also be combined with a direct memory access mode and a synchronous mode. As a result, the burden of the CPU can be shared, and a large amount of data can be transferred with high throughput.

If the type of the target data is hot data type 136, computing device 110 may determine an asynchronous block device mode combined with direct memory access as the target access mode. For example, a persistent memory can be used as an intermediate storage device to alleviate the impact of the speed difference between a fast DRAM and a slow disk, thereby improving system performance. In this case, the persistent memory also allows different qualities of service to be provided to users. For example, hot data or high-priority user data can be stored in a persistent memory with low access delay and high bandwidth, while cold data or low-priority user data can be stored in a disk. Since hot data is usually large in size, similar to recovery data, block device mode 144 can be used for hot data. However, because the importance of the hot data is lower than that of the recovery data, the hot data can use an asynchronous mode with respect to the synchronous mode used by the recovery data. In summary, the hot data can use a block device mode combined with the direct memory access mode and the asynchronous mode.

At 230, computing device 110 causes storage device 150 to access the target data in the target access mode. As described above, for computation data type 132, computing device 110 causes storage device 150 to access the target data in direct access mode 142. As a result, fast and byte-addressable access can be achieved. For recovery data type 134 and hot data type 136, computing device 110 causes storage device 150 to access the target data in block device mode 144.

In block device mode 144, computing device 110 will also perform quality of service control. The requirements for storage device 150 may vary depending on the data type, service level, and platform. In addition, storage device 150 may also be configured to share storage resources. In this case, it is appropriate to share the bandwidth of storage device 150 more accurately. For this reason, the priority of the access request can be determined and an appropriate scheduling strategy can be used to meet the variable requirements for storage device 150.

Figure 3:
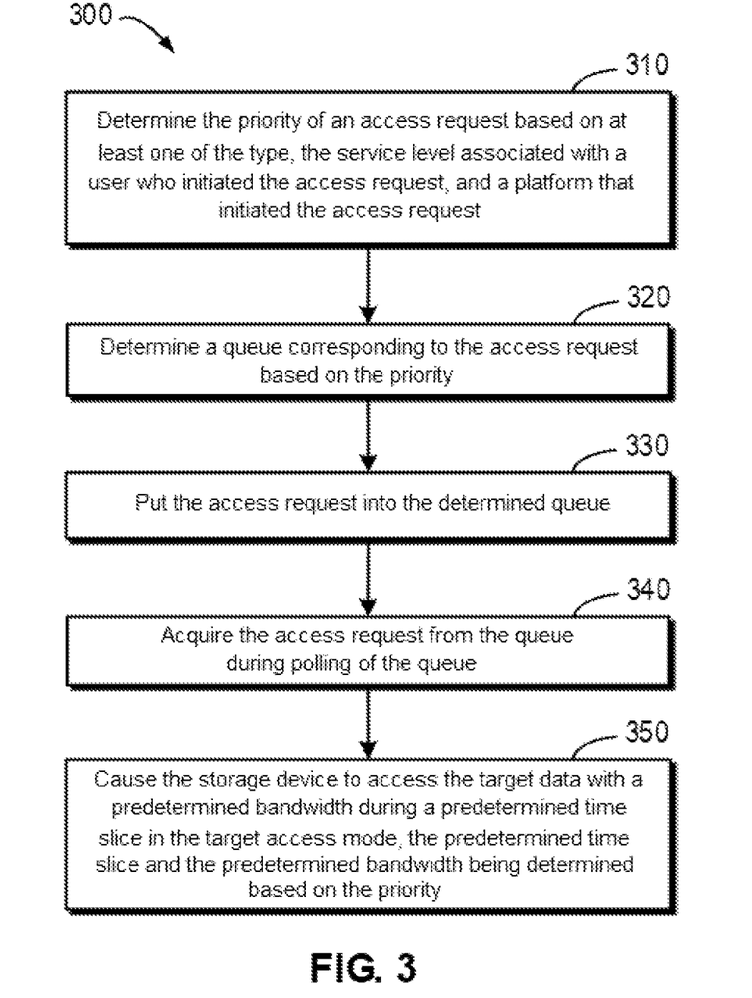
FIG. 3 illustrates a flow chart of an example of a method for performing quality of service control in a block device mode according to some embodiments of the present disclosure.

FIG. 3 illustrates a flow chart of an example of method 300 for performing quality of service control in block device mode 144 according to some embodiments of the present disclosure. Method 300 may be implemented by computing device 110 as shown in FIG. 1. Alternatively, method 300 may also be implemented by other entities besides computing device 110. It should be understood that method 300 may also include additional steps not shown and/or may omit the steps shown, and that the scope of the present disclosure is not limited in this respect.

At 310, computing device 110 may determine the priority of access request 120 based on at least one of the type of target data, the service level associated with a user who initiated access request 120, and a platform that initiated access request 120. In some embodiments, the rule for determining the priority can be flexibly defined by an administrator. For example, in the case where access request 120 involves recovery data type 134 and the associated service level is high, the priority of access request 120 may be determined to be high priority. In the case where access request 120 involves hot data type 136 and the associated service level is low, the priority of access request 120 may be determined to be low priority. In addition, in some embodiments, computing device 110 may use a priority value to indicate the priority to facilitate subsequent calculations. For example, a priority value of 0 may indicate a high priority, a priority value of 1 may indicate a medium priority, and a priority value of 2 may indicate a low priority.

At 320, computing device 110 may determine a queue corresponding to access request 120 based on the priority. At 330, computing device 110 may put access request 120 into the determined queue. For example, computing device 110 may put an access request with a high priority into a high priority queue, and put an access request with a low priority into a low priority queue.

Computing device 110 can access these queues, for example, to poll these queues. In some embodiments, computing device 110 may determine whether a queue is empty, that is, whether there is an access request in the queue. If the queue is empty, computing device 110 will poll the next queue. If the queue is not empty, computing device 110 may poll the queue. For the queue being polled, computing device 110 may determine the bandwidth and time slice allocated to the queue based on the priority or priority value. For example, for a queue with a high priority or a priority value of 0, it can be determined that the bandwidth is 50% of the maximum bandwidth and the time slice is 100 ms. For a queue with a low priority or a priority value of 2, it can be determined that the bandwidth is 10% of the maximum bandwidth and the time slice is 20 ms.

The manner in which computing device 110 accesses a queue and the manner in which bandwidth and time slice are determined are only examples. In fact, computing device 110 can provide any manner that is flexible and configurable by the administrator. For example, computing device 110 may randomly access a queue. As another example, for a high priority or a priority value of 0, it can be determined that the bandwidth is 40% of the maximum bandwidth and the time slice is 80 ms. For a low priority or a priority value of 2, it can be determined that the bandwidth is 20% of the maximum bandwidth and the time slice is 40 ms.

At 340, computing device 110 may acquire the access request from the queue during polling of the queue. At 350, computing device 110 may cause storage device 150 to access the target data with a predetermined bandwidth during a predetermined time slice in the target access mode. As described above, the predetermined time slice and the predetermined bandwidth are determined based on the priority. For example, in the case where computing device 110 acquires an access request for recovery data from a queue, computing device 110 may cause storage device 150 to transfer target data with 40% of the maximum bandwidth in an 80 ms time slice in a synchronous block device mode combined with direct memory access. Further, computing device 110 may also determine whether the time slice has expired. If the time slice has expired, computing device 110 will continue to poll the next queue.

In this way, appropriate access modes can be applied to different types of data involved in an access request to meet the requirements of access delay, data size, bandwidth, and so on. In addition, bandwidth can also be allocated to the access request based on the priority of the access request, so as to meet different requirements of users and improve the use efficiency of storage devices.

Figure 4:
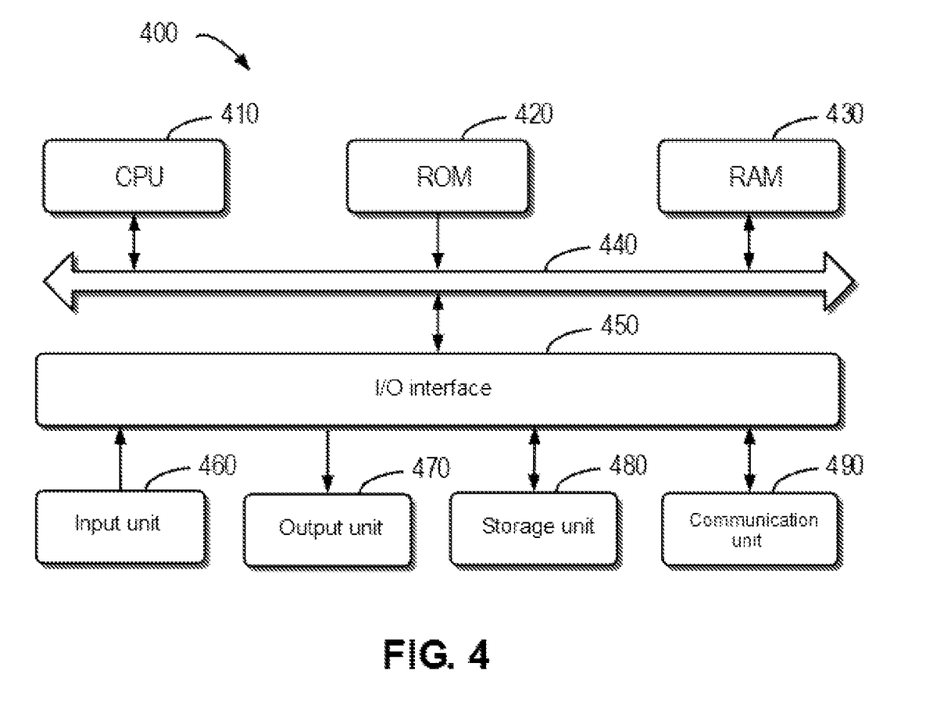
FIG. 4 illustrates a schematic block diagram of an example device that can be configured to implement an embodiment of content of the present disclosure.

FIG. 4 illustrates a schematic block diagram of example device 400 that can be configured to implement an embodiment of the present disclosure. For example, computing device 110 as shown in FIG. 1 may be implemented by device 400. As shown in the figure, device 400 includes central processing unit (CPU) 410 that may perform various appropriate actions and processing according to computer program instructions stored in read-only memory (ROM) 420 or computer program instructions loaded from storage unit 480 to random access memory (RAM) 430. In RAM 430, various programs and data required for the operation of device 400 may also be stored. CPU 410, ROM 420, and RAM 430 are connected to each other through bus 440. Input/output (I/O) interface 450 is also connected to bus 440.

A plurality of components in device 400 are coupled to I/O interface 450, including: input unit 460, such as a keyboard and a mouse; output unit 470, such as various types of displays and speakers; storage unit 480, such as a magnetic disk and an optical disc; and communication unit 490, such as a network card, a modem, and a wireless communication transceiver. Communication unit 490 allows device 400 to exchange information/data with other devices over a computer network such as the Internet and/or various telecommunication networks.

The various processes and processing described above, such as processes 200 and 300, may be executed by processing unit 410. For example, in some embodiments, processes 200 and 300 may be implemented as a computer software program that is tangibly included in a machine-readable medium, for example, storage unit 480. In some embodiments, part or all of the computer programs may be loaded and/or installed onto device 400 through ROM 420 and/or communication unit 490. When the computer program is loaded into RAM 430 and executed by CPU 410, one or more actions of processes 200 and 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semi-conductor storage device, or any suitable combination of the foregoing. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to the embodiments of the present disclosure. It should be understood that each block in the flow charts and/or block diagrams and a combination of blocks in the flow charts and/or block diagrams may be implemented by computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated various embodiments. The selection of terms used herein is intended to best explain the principles and practical applications of the embodiments or technical improvements to technologies in the market, or to enable other persons of ordinary skill in the art to understand the embodiments disclosed herein.

The invention claimed is:

1. A method for data processing, comprising:
   determining a type of target data associated with an access request, the type of the target data comprising at least one of a computation data type, a recovery data type, or a hot data type;
   selecting, based on the type of the target data, a target access mode of a storage device associated with the target data from a direct access mode and a block device mode; and
   causing the storage device to access the target data in the target access mode, wherein selecting the target access mode comprises:
   if the type is the computation data type, selecting the direct access mode as the target access mode; and
   if the type is the recovery data type and the hot data type, selecting the block device mode as the target access mode, wherein selecting the block device mode as the target access mode comprises determining a synchronous block device mode combined with direct memory access as the target access mode if the type is the recovery data type.

2. The method according to claim 1, wherein
   the computation data type is a type of data that affects a computation speed of a task being performed,
   the recovery data type is a type of data used to restore an interrupted task, and
   the hot data type is a type of data whose access frequency exceeds a threshold frequency.

3. The method according to claim 1, wherein the computation data type comprises at least one of:
   a register data type,
   a metadata type, or
   an index table type.

4. The method according to claim 1, wherein selecting the block device mode as the target access mode further comprises:
   if the type is the hot data type, determining an asynchronous block device mode combined with direct memory access as the target access mode.

5. The method according to claim 1, wherein the target access mode is the block device mode, and the method further comprises:
   determining a priority of the access request based on at least one of the type, a service level associated with a user who initiated the access request, and a platform that initiated the access request;
   determining a queue corresponding to the access request based on the priority; and
   putting the access request into the queue.

6. The method according to claim 5, wherein causing the storage device to access the target data in the target access mode comprises:
   acquiring the access request from the queue during polling of the queue; and
   causing the storage device to access the target data with a predetermined bandwidth during a predetermined time slice in the target access mode, the predetermined time slice and the predetermined bandwidth being determined based on the priority.

7. An electronic device, comprising:
   at least one processing unit; and at least one memory coupled to the at least one processing unit and storing instructions, which when executed by the at least one processing unit, cause the device to perform actions, the actions comprising:
determining a type of target data associated with an access request, the type of the target data comprising at least one of a computation data type, a recovery data type, or a hot data type;
selecting, based on the type of the target data, a target access mode of a storage device associated with the target data from a direct access mode and a block device mode; and
causing the storage device to access the target data in the target access mode, wherein selecting the target access mode comprises:
if the type is the computation data type, selecting the direct access mode as the target access mode; and
if the type is the recovery data type and the hot data type, selecting the block device mode as the target access mode, wherein selecting the block device mode as the target access mode comprises:
if the type is the recovery data type, determining a synchronous block device mode combined with direct memory access as the target access mode; and
if the type is the hot data type, determining an asynchronous block device mode combined with direct memory access as the target access mode.

8. The device according to claim 7, wherein
the computation data type is a type of data that affects a computation speed of a task being performed,
the recovery data type is a type of data used to restore an interrupted task, and
the hot data type is a type of data whose access frequency exceeds a threshold frequency.

9. The device according to claim 7, wherein the computation data type comprises at least one of:
a register data type,
a metadata type, or
an index table type.

10. The device according to claim 7, wherein selecting the block device mode as the target access mode further comprises:
if the type is the hot data type, determining an asynchronous block device mode combined with direct memory access as the target access mode.

11. The device according to claim 7, wherein the target access mode is the block device mode, and the method further comprises:
determining a priority of the access request based on at least one of the type, a service level associated with a user who initiated the access request, and a platform that initiated the access request;
determining a queue corresponding to the access request based on the priority; and
putting the access request into the queue.

12. The device according to claim 11, wherein causing the storage device to access the target data in the target access mode comprises:
acquiring the access request from the queue during polling of the queue; and
causing the storage device to access the target data with a predetermined bandwidth during a predetermined time slice in the target access mode, the predetermined time slice and the predetermined bandwidth being determined based on the priority.

13. A non-transitory computer-readable medium including machine-executable instructions, which when executed by a machine, cause the machine to perform actions, the actions comprising:
determining a type of target data associated with an access request, the type of the target data comprising at least one of a computation data type, a recovery data type, or a hot data type;
selecting, based on the type of the target data, a target access mode of a storage device associated with the target data from a direct access mode and a block device mode; and
causing the storage device to access the target data in the target access mode, wherein selecting the target access mode comprises:
if the type is the computation data type, selecting the direct access mode as the target access mode; and
if the type is the recovery data type and the hot data type, selecting the block device mode as the target access mode, wherein selecting the block device mode as the target access mode comprises determining a synchronous block device mode combined with direct memory access as the target access mode if the type is the recovery data type.

14. The computer-readable medium according to claim 13, wherein
the computation data type is a type of data that affects a computation speed of a task being performed,
the recovery data type is a type of data used to restore an interrupted task, and
the hot data type is a type of data whose access frequency exceeds a threshold frequency.

15. The computer-readable medium according to claim 13, wherein the computation data type comprises at least one of:
a register data type,
a metadata type, or
an index table type.

16. The computer-readable medium according to claim 13, wherein selecting the block device mode as the target access mode further comprises:
if the type is the hot data type, determining an asynchronous block device mode combined with direct memory access as the target access mode.

17. The computer-readable medium according to claim 13, wherein the target access mode is the block device mode, and the method further comprises:
determining a priority of the access request based on at least one of the type, a service level associated with a user who initiated the access request, and a platform that initiated the access request;
determining a queue corresponding to the access request based on the priority; and
putting the access request into the queue.

* * * * *